United States Patent
Nakahara

(10) Patent No.: US 7,505,176 B2
(45) Date of Patent: Mar. 17, 2009

(54) IMAGE PROCESSING APPARATUS

(75) Inventor: Nobuhiko Nakahara, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 728 days.

(21) Appl. No.: 11/082,046

(22) Filed: Mar. 17, 2005

(65) Prior Publication Data

US 2006/0209346 A1     Sep. 21, 2006

(51) Int. Cl.
 *G06K 15/00*  (2006.01)
 *H04N 1/405*  (2006.01)

(52) U.S. Cl. .................. 358/3.06; 358/3.1

(58) Field of Classification Search ......... 358/296–305, 358/1.9–3.32
 See application file for complete search history.

(56) References Cited

U.S. PATENT DOCUMENTS 5,774,634 A * 6/1998 Honma et al. .............. 358/1.9
5,949,964 A    9/1999 Clouthier et al.
6,021,217 A    2/2000 Nakahara
6,067,066 A * 5/2000 Kubota et al. ............... 345/98
6,343,157 B1* 1/2002 Yada .......................... 382/246
2002/0191694 A1* 12/2002 Ohyama et al. ......... 375/240.01
2003/0107768 A1  6/2003 Crounse

FOREIGN PATENT DOCUMENTS

| JP | 11-015966 A | 1/1999 |
| JP | 11-187265 A | 7/1999 |
| JP | 2003-234900 A | 8/2003 |

* cited by examiner

*Primary Examiner*—Douglas Q Tran
(74) *Attorney, Agent, or Firm*—Foley & Lardner LLP

(57) ABSTRACT

A halftoning process section in an image processing apparatus includes a process switching section that switches a process of a signal from a color conversion process section. The process switching section executes switching in accordance with input tag data. In the case of a text, a text halftoning process section executes a halftoning process. In the case of graphics, a bit number increasing section increases a bit number for graphics, and a graphics halftoning process section executes a halftoning process. In the case of a photo, a bit number increasing section increases a bit number for a photo, and a photo halftoning process section executes a halftoning process.

10 Claims, 7 Drawing Sheets

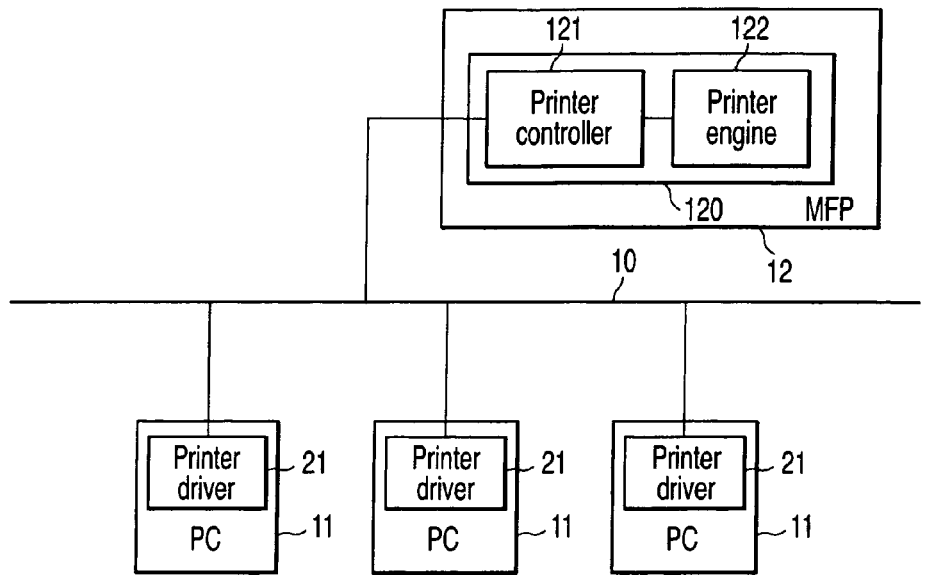
F I G. 1
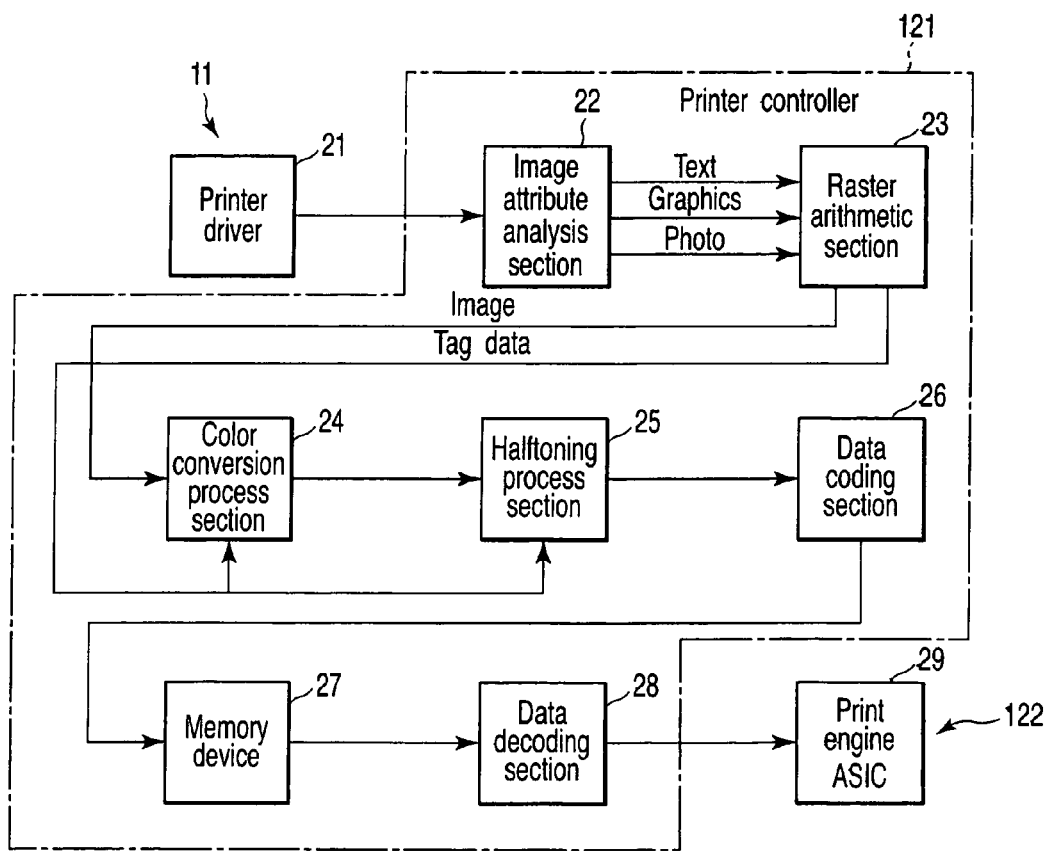
F I G. 2

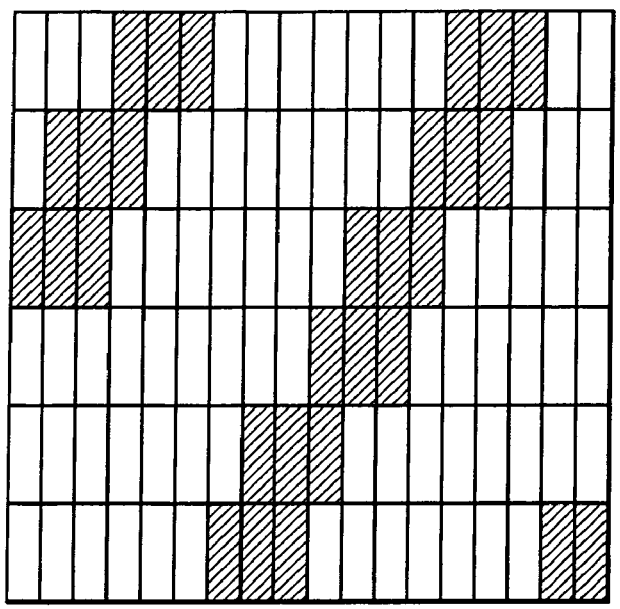
F I G. 7
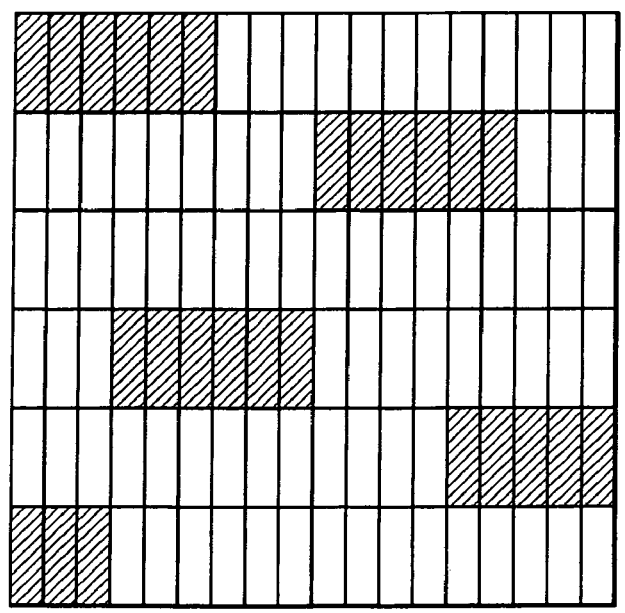
F I G. 8

IMAGE PROCESSING APPARATUS

BACKGROUND OF THE INVENTION

1. Field of the Invention

The present invention relates to an image processing apparatus that executes an image process, such as a halftoning process, in an image forming apparatus.

2. Description of the Related Art

Recently, an apparatus, which is typified by a digital multi-function peripheral (MFP), is steadily gaining in popularity. This apparatus totally handles a variety of digitized image data of, e.g. a copier, a printer, a scanner and a FAX, temporarily stores these data in a memory medium such as an HDD, and reuses the data. Very important development items in this type of system are the realization of an architecture that can handle various data easily and seamlessly, and the reduction in cost of the system itself.

On the other hand, within the MFP, practical use has widely been made of an image forming apparatus using an electrophotographic process system such as a laser printer that drives a laser on the basis of image data and executes tone reproduction. In addition, color image forming apparatuses, which repeat the above process for three colors or four colors or reproduce a color image by a tandem process, have become increasing popular. With these developments, the resolution of these output apparatuses has been increasing in recent years. For example, resolutions of, e.g. 600 dpi and 1200 dpi are realized.

In general, when a color image is handled, a monitor or the like, which is a part of a computer, treats the image by an 8-bit RGB system for each color, and a printer or the like treats the image by an 8-bit CMY system or CMYK system for each color. In usual cases, the monitor purely displays 1 pixel with multi-value gray levels by brightness modulation for each of RGB. On the other hand, the output apparatus, which is typified by a printer, employs in a final stage a pseudo-tone (halftoning) process, such as a dither method or a density pattern method, which uses a threshold matrix. Basically, a binary output, which corresponds to ON/OFF of a dot in a pixel unit or a smaller divided pixel unit, is controlled in a predetermined small area. Thereby, the tone is expressed on the basis of the area. In the case of a color image, this process is applied to four colors of C (cyan), M (magenta), Y (yellow) and K (black), or three colors of C (cyan), M (magenta) and Y (yellow). On a final print surface, 3-color or 4-color micro-dots are overlaid, and a fine color tone image is reproduced. Actually, however, K that is produced by overlaying color materials of CMY has no ideal color characteristics of K. Thus, most of conventional color image output apparatuses are based on CMYK.

A document, graphic, photo, or the like, which is created and edited by a host computer or a personal computer, is converted to a PDL (e.g. Postscript or PCL) by a printer driver. The converted data is sent to an image output apparatus via relay means such as a LAN or a USB. On the image output apparatus side, a controller section in the image processing apparatus interprets the language of the data and develops it into raster data (RIP processing).

In general, a halftoning process is executed in the controller section. Image data that is output from the controller has a tone reproduction capability corresponding to the printing performance of the output apparatus, for example, 1 bit to 8 bits per pixel for each color. Basically, the number of bits of the output data is designed in consideration of the performance of the engine. Alternatively, the halftoning process may not be executed in the controller, and tone reproduction may be executed by applying an engine-side laser modulation technology (e.g. pulse width modulation technique or power modulation technique). In principle, from the standpoint of image quality, the possibility that a high-quality image is reproduced becomes higher as the number of bits in the RIP increases.

In the output apparatus such as an electrophotographic apparatus, output print characteristics (e.g. dot gain) have a large distortion relative to ideal linear characteristics due to the complexity of the process. In this respect, the halftoning process is very important, and the image quality varies to a great degree depending on design specifications including an algorithm and parameters. The halftoning process has a great influence on the image quality, and various algorithms have conventionally been proposed.

For simple description, algorithms for the halftoning process are classified into AM modulation (cyclic modulation) and FM modulation (frequency modulation). In the AM modulation, the size of a basic halftone dot is modulated at each gray level on the basis of a given cycle, angle and shape, and thus the tone is reproduced. In the FM modulation, a mean distance between fixed-sized halftone dots is varied at each gray level, and thus the tone is reproduced. In general, in some cases, an error diffusion process may be regarded as a kind of the FM modulation.

When these methods are applied to the output apparatus such as the electrophotographic apparatus, the following problems will arise. In the electrophotographic apparatus, it is difficult to form an independent 1 pixel (e.g. 1 pixel of 600 dpi) in a stable state with the same resolution as the printer (i.e. 1 dot of 600 dpi is reproduced by the printer of 2400 dpi). In general, if an FM modulation type dither matrix is used, a high-quality image cannot be obtained.

Thus, by using an AM modulation type dither matrix, the tone is reproduced on the basis of the area in units of a plurality of pixels combined. Thereby, a stable image is obtained. AM modulation type dither methods include various shape-type methods, such as a half-tone dot type, a line type and a chain type. These methods, however, are essentially the same in that a plurality of dots are gathered in a given direction, thereby reproducing tone.

In this case, in order to increase the number of pseudo-gray levels to such a level as to reproduce a visually satisfactory image, it should suffice if the basic size of each halftone-dot of a threshold matrix is increased. However, the resolution decreases as the basic size of each halftone-dot becomes greater. In the halftoning process, the resolution characteristics and the tone characteristics are contradictory. In the case where this halftoning process is executed, even if the tone is satisfactory, the image quality of an edge part of a gray-level character or line in the image, which represents resolution information, considerably deteriorates.

The electrophotographic apparatus does not have a resolution of several-thousand dpi, which is a resolution level of the printer. A currently dominant type of electrophotographic apparatuses have resolutions of about 600 dpi to 1200 dpi at most. There are too many geometrical restrictions in order to obtain satisfactory tone reproduction by creating halftone-dots with such a resolution and a given angle and line number (about 100 to 200 lines). It is not impossible to forcedly form a screen, ignoring a geometrical position error in digital arithmetic operations. However, if the halftoning process is executed using a threshold matrix that is formed in this way, an image that is formed on a final print surface includes, as a matter of course, geometrical errors of many halftone centers at locations on the two-dimensional plane. Consequently, textures, which are unsightly, occur at given gray levels, and graininess increases.

In order to solve these problems, there has been developed an image forming apparatus such as an electrophotographic apparatus, wherein a technique of PWM (Pulse Width Modulation), for instance, is used, and multi-value image data is generated by subjecting input image data to a multi-value dither process, etc. Using the multi-value image data, the output area within 1 pixel is modulated, and the inside of the 1 pixel is expressed with several gray levels.

In the image forming apparatus capable of printing multi-value image data, various image processes, such as a color conversion process, an UCR (under-color removal) process and a gamma correction process, are executed. Thereafter, in order to reproduce the prescribed number of gray levels, which is inherent to the printer engine, a multi-value pseudo-tone process is executed for each color. Thereby, multi-value image data of 1 pixel bit is obtained. The image reproducibility is enhanced by concentrating a more information amount in 1 pixel. However, the fact that the number of bits that are handled at 1 pixel means that the data amount to be handled increases accordingly. Even if the technology is constantly developing, the amount of multi-value data, which is treated with the resolution of the output apparatus such as the electrophotographic apparatus, is enormous, and a serious problem arises with the cost of, e.g. a memory load.

Under the circumstances, in modern output apparatuses, multi-value image data is not handled as such. In some cases, data is compressed by some compression process at a given point along the image path, and thus the performance of the entire system is improved.

It is necessary to treat various images, such as a text, graphic and photo, as print-out images. Each object has different important characteristics. For example, a text needs to have good resolution characteristics such as edge reproducibility, a photo needs to have good tone characteristics, and a photo needs to have both good characteristics. As mentioned above, a single halftoning process cannot meet the requirements for both characteristics. Thus, an optimal screen is individually used for each of objects, and the image quality is enhanced.

On the other hand, the functions of the MFP include, aside from the printer function, a PC-FAX function, a BOX function, etc. It is preferable to seamlessly use data between the functions. For example, an image to be handled in the FAX function is of 1 bit/pixel, according to the standard of the FAX function. In the PC-FAX function, too, it is necessary to treat a PIP-processed image with 1 bit/pixel. Images to be handled in the BOX function have different bit numbers, depending on uses, and there is a case in which a data format that is compressed by a general-purpose scheme, such as JPEG, is preferable.

For example, when the printer is used, the image quality can be greatly improved. For this purpose, it is preferable to treat an image with multi-bit/pixel. Depending on the functions, the proper bit number for 1 pixel differs. Some data conversion is needed in a case of reusing an image, which is stored in a hard disk drive or the like, for another function. There is a problem of complexity in data handling.

There are known U.S. Pat. No. 5,949,964 and Jpn. Pat. Appln. KOKAI Publication No. 2003-234900, which disclose techniques for solving the above problems.

In U.S. Pat. No. 5,949,964, rasterized image data is encoded along with a discrimination signal for discriminating an object, and is temporarily stored in a memory device. The encoded image data and discrimination signal, which are retrieved from the memory device, are decoded, and the decoded image data is subjected to a halftoning process on the basis of the similarly decoded discriminating signal. Thus, an optimal halftone output for each object is obtained. In addition, since a data compression process is executed at a point along the image path, the capacity of the memory device or the like can be reduced.

In general, reversible compression is desirable as compression of image data that is exactly rasterized by a controller. The controller has to handle complex and various objects, and images that are formed by rasterizing these objects must essentially be reproduced with precision. Basically, except for some kinds of photo images, it is necessary to avoid occurrence of unexpectable noise due to compression of a given object, which may lead to serious degradation in image quality.

In a case where 8-bit multi-value image data is handled, for example, if the image data is compressed by irreversible compression such as JPEG, the reproduction performance for high-frequency image data is very low. Thus, such irreversible compression is not suited to objects such as texts and fine graphics. On the other hand, when reversible compression is executed, the code amount of a natural picture such as a photo cannot sufficiently be reduced, contrary to expectation, and a very large memory is needed. Thus, there is the problem that the advantageous effect of the system configuration is small, compared to its complexity.

It is possible to think of a method in which an optimal compression method is switched in accordance with the property of each object. This method, however, requires very complex processing, and the cost effectiveness of the system configuration is low.

Furthermore, the image data and the object discrimination signal have to be compressed in the path of the compression process. Consequently, there arises such a problem that the process tends to become complex and the data reduction effect by the compression is low.

BRIEF SUMMARY OF THE INVENTION

The object of an aspect of the present invention is to provide an image processing apparatus capable of executing a multi-value halftoning process with a simple structure, and obtaining image data with a high compression ratio.

According to an aspect of the present invention, there is provided an image processing apparatus that executes an image process for input image data, comprising: an attribute analysis section that analyzes an attribute of the image data; halftoning process sections associated with a plurality of attributes, which execute multi-value halftoning processes in accordance with attributes that are analyzed by the attribute analysis section; a switching section that executes switching to the halftoning process section of the attribute that corresponds to an attribute analyzed by the attribute analysis section; a coding section that encodes image data that is subjected to the multi-value halftoning process in the halftoning process section that is switched by the switching section; a memory section that stores the image data that is encoded by the coding section; and a decoding section that decodes the image data that is stored in the memory section.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

FIG. 1 shows a system configuration using a digital multi-function peripheral according to an image processing apparatus of the present invention;

FIG. 2 is a block diagram that shows an example of the structure of a printer controller within a printer;

FIG. 7 shows a threshold matrix having such a characteristic that an output pattern becomes a line-screen pattern;

FIG. 8 shows a conversion result of a halftoning process using a threshold matrix having such a characteristic that an output pattern becomes a halftone-dot-screen pattern;

DETAILED DESCRIPTION OF THE INVENTION

Figure 3:
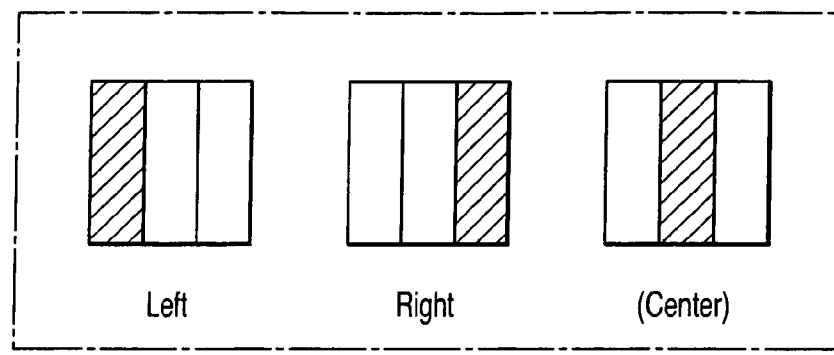
FIG. 3 is a view for explaining print positions.

An embodiment of the present invention will now be described with reference to the accompanying drawings.

FIG. 1 shows a system configuration using a digital multi-function peripheral (MFP) 12 according to an image processing apparatus of the present invention. In the system shown in FIG. 1, PDL data that represents the structure of image data is transferred from an arbitrary personal computer (PC) 11, which is connected to a network 10 that has recently been prevailing with great rapidity, to a printer 120 that is a partial function within the MFP 12. Specifically, the PC 11 is configured to transfer a PDL code or raster data from a printer driver 21 to a printer controller 121 of the printer 120 in accordance with characteristics of interface with the printer 120.

The printer 120 is configured such that the printer controller 121 controls a printer engine 122.

The printer controller 121 develops a page description language, such as PDL, which is coded image data from the PC 11, into a bitmap and executes various image processes, and stores the resultant data in a built-in image memory (memory device) (not shown).

The printer engine 122 converts the bitmap image data from the printer controller 121 to a drive signal, and executes a printing operation, for example, by feeding paper and driving a laser.

The PC 11 and printer 120 are not necessarily connected over the network, and may be connected by a USB or the like. In addition, the PC 11 and printer 120 may be connected in one-to-one correspondence. The interface between the printer controller 121 and printer engine 122 basically depends on the architecture of the printer, and is not specifically standardized.

FIG. 2 shows an example of the structure of image process sections that are implemented by the printer controller 121 within the printer 120. Specifically, the printer controller 121 comprises an image attribute analysis section 22, a raster arithmetic section 23, a color conversion process section 24, a halftoning process section 25, a data coding section 26, a memory device 27, and a data decoding section 28.

The image attribute analysis section 22 analyzes the attribute of an image on the basis of the PDL code, and classifies the kind of the image.

The raster arithmetic section 23 converts the code data to bitmap data.

The color conversion process section 24 executes color conversion to CMY or CMYK, which are reproduction colors in the printer 120.

The halftoning process section 25 executes a halftoning processing using a threshold matrix for each color.

The data coding section 26 executes data compression.

The memory device 27 comprises a memory or an HDD and stores image data.

The data decoding section 28 reads out image data from the memory device 27, and decodes the coded data according to a predetermined procedure.

Next, the image process in the printer controller 121 is described.

To start with, the printer driver 21 in the PC 11 transfers image data (PDL data) to the printer controller 121.

The image attribute analysis section 22 in the printer controller 121 analyzes the attribute of the image data on the basis of the PDL code of the received PDL data, and classifies the kind of the image data. Basically, the image data has one of a text attribute, a graphic attribute and a photo bitmap attribute. The classified PDL data attribute is assigned a corresponding tag for a subsequent process. For example, when the image data has the above-mentioned three attributes, 2-bit tag data is necessary.

Subsequently, the raster arithmetic section 23 converts the code data of the image data to bitmap data. For example, in the case of a color printer, 8-bit digital data of each of RGB is converted to bitmap data. In the case of a monochromatic printer, single-color 8-bit digital data is converted to bitmap data. In this case, each bitmap data is assigned tag data that corresponds to the position of the bitmap data.

The color conversion process section 24 converts the converted each-color 8-bit RGB signal, which is a standard signal in monitors, to a CMY signal or CMYK signal of reproduction colors in the printer. RGB indicate red, green and blue, and CMYK indicate cyan, magenta, yellow and black, respectively.

In this embodiment, the color conversion process section 24 is configured to switch the color conversion process in accordance with the attribute of the image data on the basis of the tag data.

In the case of the monochromatic printer, the color conversion process section 24 is needless.

Subsequently, the halftoning process section 25 executes a halftoning process using a threshold matrix for each color, thereby converting 1-pixel data to several-bit image data of each color with a less number of gray levels, which matches with the printing performance of the printer 120. In this embodiment, it is assumed that the RIP resolution at this time is 600 dpi/2 bits (4-values).

In the present embodiment, it is assumed that in the 4-value state, 0 indicates OFF, 3 indicates full formation of 1 pixel, and each of 1 and 2 indicates formation of an intermediate pixel when 1 pixel is divided into three pixel portions.

The halftoning process section 25 is configured to switch the halftoning process in consideration of the characteristics of images of respective objects, so that the optimal halftoning process can be executed in accordance with the tag data.

The data coding section 26 compresses the halftoned image data. A reversible compression scheme, such as JBIG or JBIG2, is suitable for the compression in this case, since the halftoned image data has a quantized cyclic regularity. The details will be described later.

The compressed image data is temporarily stored in the memory device 27. Thereby, the capacity of data that is stored in the memory device 27 can be reduced, and the performance of the entire system can be enhanced.

The data decoding section 28 reads out image data from the memory device 27, and decodes the coded image data according to a predetermined procedure.

A print engine ASIC section 29 in the printer engine 122 converts the finally generated image data to a PWM (Pulse Width Modulation) signal for driving the laser, and forms an image. In the multi-value PWM, in general, a position control signal is internally generated at the same time on the basis of the input image data. When an intermediate-tone pixel is printed, as shown in FIG. 3, the print start reference position is controlled, for example, at the left position, right position, (center) position, etc. In general, an image can be formed if the position control signal is set at the left or right. If the print position needs to be controlled with higher precision, the central position signal is used.

Next, the halftoning process section 25, which is the main point of the embodiment, is described in greater detail. In this embodiment, a halftoning process with 600 dpi/2-bit is basically described.

The principle of the halftoning process using a threshold matrix is first explained. The halftoning process is a process based on a very simple theory. That is, the magnitude of input image data is compared with the magnitude of a threshold at the corresponding position in one-to-one correspondence, and ON/OFF of the associated pixel is determined based on the comparison.

Figure 4:
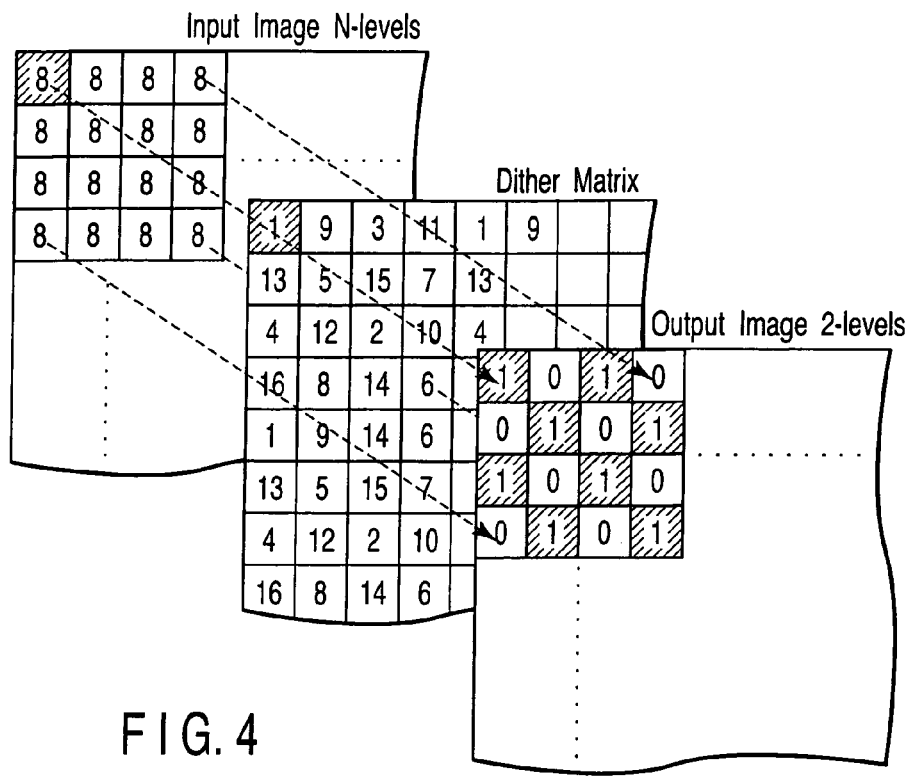
FIG. 4 is a schematic diagram that illustrates a case in which a 4×4 Bayer type dither matrix is used.

Basically, in an ordinary 2-value dither process, it should suffice if consideration is given to an array of threshold values in a single 1-plane dither matrix. A 2-value output image is obtained by pixel-to-pixel comparison between an input pixel and a threshold value at the corresponding position in the dither matrix. FIG. 4 illustrates this method. FIG. 4 is a schematic diagram that illustrates the case in which a conventional 4×4 Bayer type dither matrix is used.

For simple description, in this example, the input image is compared with thresholds of the dither matrix that corresponds to a 4-bit input. For instance, if an input pixel value is greater than the corresponding threshold of the dither matrix, 1 (black) is output. If an input pixel value is less than the corresponding threshold of the dither matrix, 0 (white) is output. As a whole, a 2-value output comprising a combination of 1's and 0's is obtained.

The dither matrix shown in FIG. 4 is repeatedly used on tiles at a basic dither matrix (reference threshold array) size cycle. The above-described process is similarly executed for all input pixels.

Figure 5:
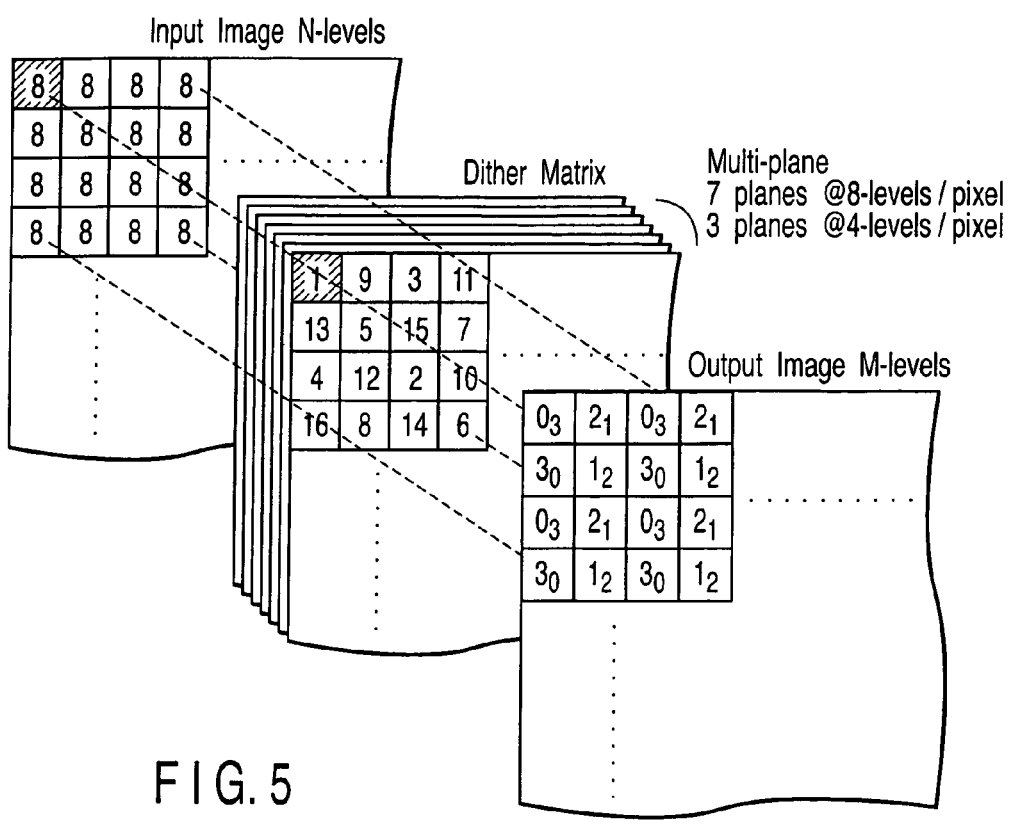
FIG. 5 is a schematic diagram that illustrates the outline of a multi-value dither process.

On the other hand, in the multi-value (e.g. 2-bit) dither process, consideration needs to be given to the depth direction (pixel level), in addition to the above-mentioned basic dither array. For instance, a multi-value dither process of D values is executed, an (D-1) number of threshold planes are needed. An input image is compared with dither thresholds of each threshold plane, and a D-value output image is obtained. FIG. 5 is a schematic diagram that illustrates the multi-value dither process in this case.

In this case, in general, a higher image quality is obtained if some correlation is given to the respective threshold planes in the dither process. In many cases, thresholds of the (D-1) number of dither matrices are automatically calculated on the basis of the reference threshold array.

Figure 6:
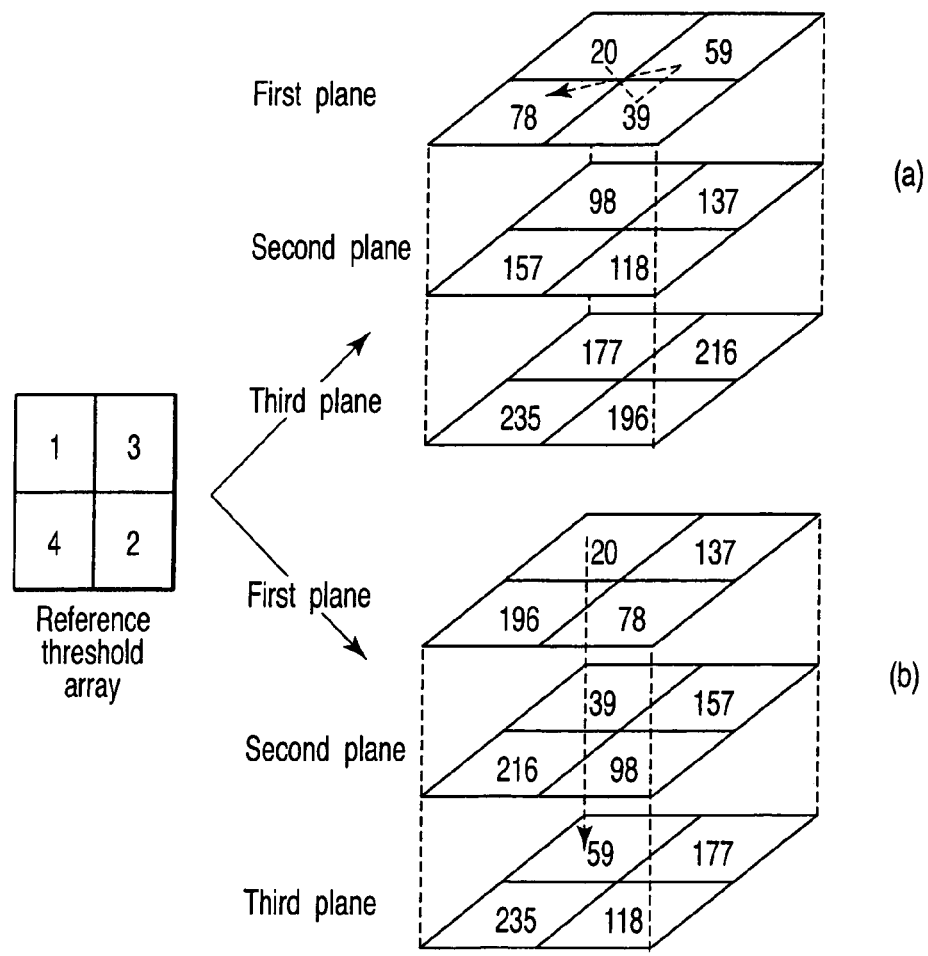
FIG. 6 is a view for explaining a reference threshold array.

Multi-value dither processes, in which consideration is given to the correlation between the planes, may generally be classified into two sequences, as shown in parts (a) and (b) of FIG. 6, according to the method of distributing thresholds on the successive planes. For simple description, FIG. 6 illustrates multi-value dither processes for converting 8-bit input image data to a 1-pixel 4-value (2-bit) image using a 2×2 reference threshold array.

In the sequence method illustrated in part (a) of FIG. 6, thresholds are assigned from the smallest one to each plane on a plane-by-plane basis. This sequence is associated with the dither process that is applicable to a printer, such as an ink jet printer, that basically suffers little effect due to the condition of appearance of adjacent pixel dots and is capable of stably reproducing an image in units of an independent pixel. The resolution in this case is very high and can almost match with the resolution performance of the engine, and the dot density is high. This is an ideal process when an image is reproduced by area coverage modulation. However, since the screen tends to be filled with same-size or similar-size pixels, this method may be affected by the printing precision.

In the sequence method shown in part (b) of FIG. 6, thresholds are successively assigned from the smallest one to a given pixel of each plane, which is the object of processing. This method is associated with the dither process that is widely applicable to a printer, such as a laser printer or a thermal printer, which tends to be affected by the condition of appearance of adjacent pixel dots and has difficulty and instability in pixel formation of an independent pixel. In this method, the resolution is low and the dot density is low. If the threshold array of the dither is formed on the basis of a dot-fattening type, an image that is called a halftone-dot image is formed. Since the resolution is low, a slight non-uniformity in printing precision in a pixel unit can be canceled.

In each of these examples, if one reference threshold plane and the pixel growth order in depth direction are defined, all thresholds can automatically be derived.

There is another method which is regarded as an intermediate type between the above methods. For instance, reference should be made to Jpn. Pat. Appln. KOKAI Publication No. 11-187265, which was previously filed by the applicant of the present application.

As has been described above, there are various types of multi-value dither processes with different inter-plane sequences. The present embodiment will further be described on the basis of the method shown in part (b) of FIG. 6. As mentioned above, in the electrophotographic engine, stable image reproduction is realized if an image is reproduced by gathering a plurality of pixels into a group.

FIGS. 7 and 8 show examples of appearances of pixels with different halftone-dot shapes, which are output by two kinds of very simplified halftoning processes. In each example, a plurality of pixels are treated as a group, and the manner of gathering pixels is different. FIG. 7 shows a threshold matrix having such characteristics that an output pattern becomes a line-screen pattern, and a plurality of pixels are gathered in a line shape. FIG. 8 shows an example of a conversion result of a halftoning process, which uses a threshold matrix having such characteristics that an output pattern becomes a halftone-dot-screen pattern, and a plurality of pixels are gathered as a two-dimensional circular mass.

When 1 pixel is regarded as 1 unit, the line-screen type output pattern has multiple output pixel values (0, 1, 2, 3). On the other hand, the halftone-dot-screen type output pattern has, in the main, pixel values of 0 and 3 corresponding to solid images, and it is understood that the frequency of appearance of intermediate pixel values is low. This tendency is unchanged even if various images of a text, graphic and photo are input.

The reason for this is as follows. When the sequence method shown in part (b) of FIG. 6 is faithfully executed, there is, at most, only one pixel with an intermediate tone value in halftone dots that constitute a single halftone dot with respect to input values that are uniform over the surface, because of the basic principle of the multi-value dither process. For instance, the halftone dots that constitute a single halftone dot form a single halftone dot by 8 pixels.

On the other hand, in the output apparatus such as a printer, images with various spatial frequencies need to be handled. When an image having a higher frequency than the number of lines of halftone dots is input, it is likely that the number of pixels with intermediate tone values increases. However, from the statistical viewpoint concerning images, the tendency remains unchanged that the number of pixels with intermediate tone values is much smaller than the number of pixels with solid-image tone values.

Figure 9:
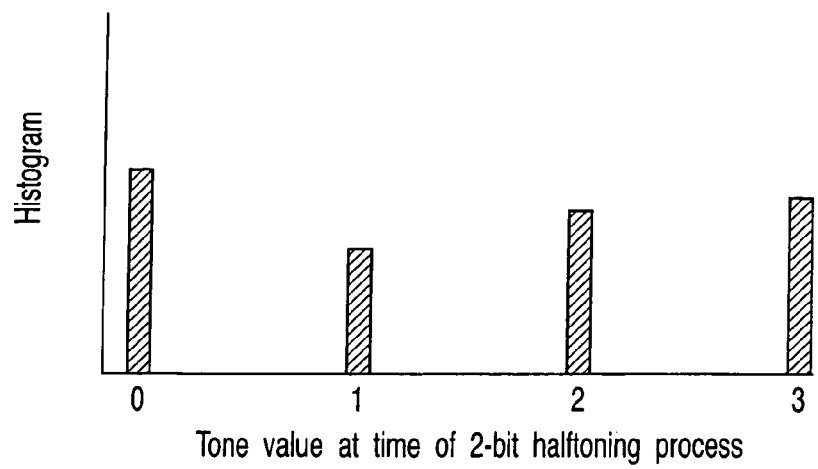
FIG. 9 is a histogram showing gray-level values at a time of 2-bit halftoning.
Figure 10:
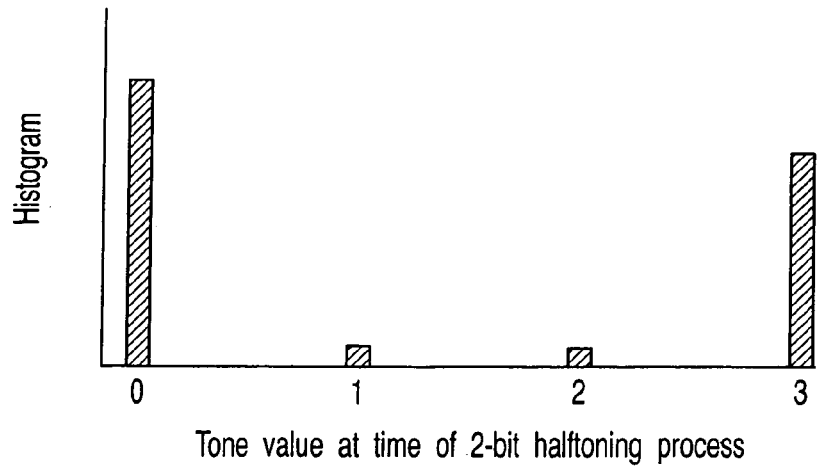
FIG. 10 is a histogram showing gray-level values at a time of 2-bit halftoning.

FIGS. 9 and 10 show histograms of output images that were obtained by subjecting various input images to the multi-value (2-bit) halftoning process on the basis of the above-described basic principle.

FIG. 9 shows a histogram of an output image that was obtained when the halftoning process was executed using the sequence shown in part (a) of FIG. 6, or when the halftoning process was executed using a specific sequence like a line-screen pattern.

FIG. 10 shows a histogram of an output image that was obtained when the halftoning process was executed using the sequence shown in part (b) of FIG. 6 or, to be more specific, or when a halftone-dot-screen process was executed.

In FIG. 10, the possibility is very low that the output image after the halftoning process includes intermediate tone values. Most of pixels basically have solid-image pixel values of 0 and 3. As regards this histogram, experiments were conducted with respect to various input images. It was found that when the process was executed with a standard number of halftone lines (100 to 200 lines at 600 dpi), the ratio of intermediate tone values was several % at most.

Figure 11:
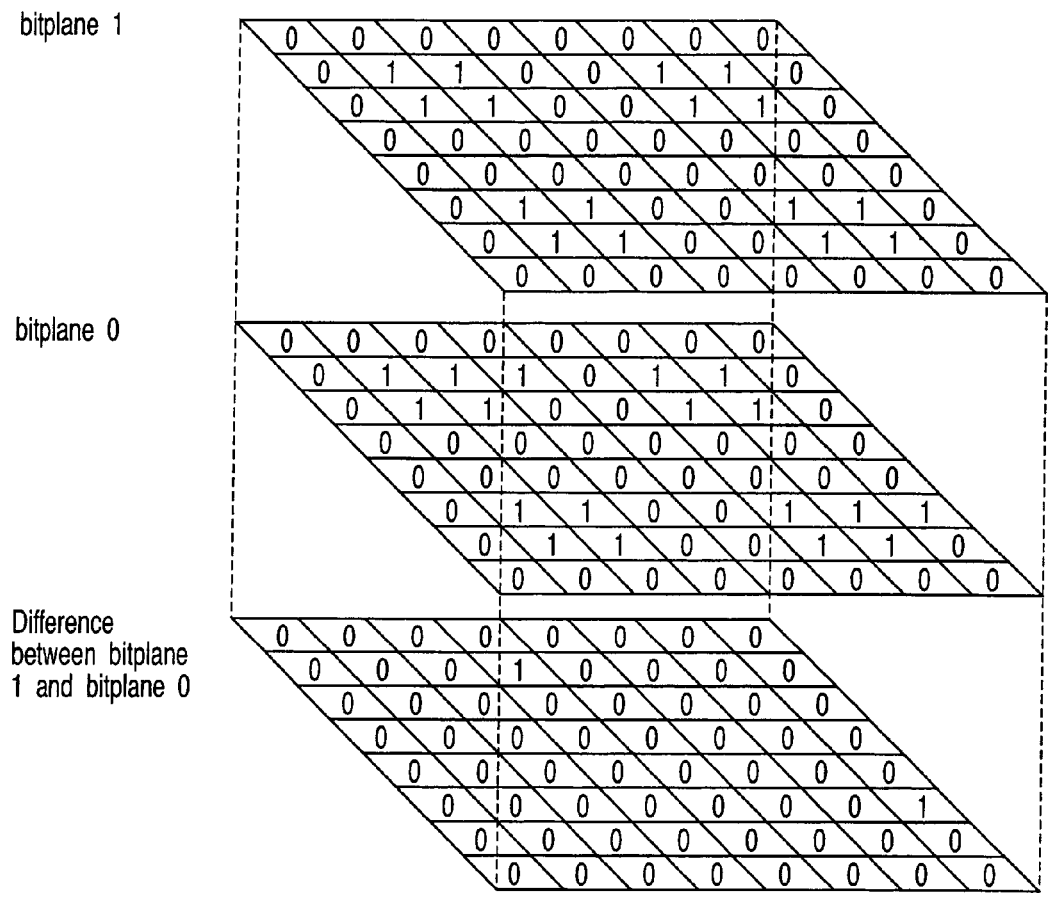
FIG. 11 shows a state in which an output image is divided into bitplane units.

This means that there is little difference in data signals between bitplanes when the output image is divided into bitplanes, as shown in FIG. 11. Specifically, in FIG. 11, there is close correlation between a bitplane 1 and bitplane 0, and output characteristics are very similar.

Taking advantage of these characteristics, the subsequent-stage data coding section 26 can greatly increase the compression ratio of the image. Specifically, when attention is first paid to one bitplane, an image is formed with output characteristics based on the designed halftone-dot line number cycle and dither order. Thus, a pattern, which is already a clear halftone-dot design pattern, can be compressed with a compression ratio of one several-tenth by using a general-purpose reversible compression scheme such as JBIG or JBIG2.

On the other hand, when attention is paid to the successive bitplanes, there is close correlation between the bitplanes (i.e. little difference between data signals). Thus, a difference between a reference bitplane (e.g. bitplane 1 in FIG. 11) and another bitplane (e.g. bitplane 0 in FIG. 11) is encoded by a coding scheme such as a run-length method. Thereby, in this case, too, the compression ratio can greatly be increased. Even with this difference information, a signal, which is correlated with a two-dimensionally designed screen cycle, is obtained. Thus, a coding scheme that is robust with respect to a cyclic image is used.

Thereby, in general, the data amount of the output image that is subjected to the multi-value halftoning process of this embodiment can greatly be reduced, and the cost of the system can also be reduced.

The present embodiment relates to the 2-bit process as the multi-value halftoning process. The tendency of this embodiment, however, is unchanged even if a halftoning process of any bit number is executed. It is basically preferable to compress one reference bitplane by a coding scheme such as JBIG, and to encode another plane by using information on a difference from the reference bitplane. It is also possible to vary the number of bits of the multi-value halftoning process, depending on objects.

Next, a description is given of the halftoning process using the tag data.

As mentioned above, depending on the kinds of images, the objects have different important characteristics. For example, a text needs to have good resolution characteristics such as edge reproducibility, a photo needs to have good tone characteristics, and a photo needs to have both good characteristics. As mentioned above, a single halftoning process cannot meet the requirements for both characteristics. Thus, in this embodiment, an optimal screen is individually used for each of objects with reference to tag data, and the image quality is enhanced.

Specifically, for an object such as a text that needs to have good resolution characteristics, a halftone screen, which has output characteristics with a greater number of lines and a higher spatial frequency, is applied. For an object such as a photo that needs to have good tone characteristics, a halftone screen, which has output characteristics with a less number of lines than in the object such as text and a relatively low spatial frequency, is applied in consideration of engine characteristics, and thus more stable halftone dots can be reproduced. For an object such as a graphic, an optimal halftone screen is applied in consideration of intermediate characteristics between the characteristics of the text and photo and also in consideration of engine characteristics.

Attention is now paid to the relation between multi-values and 2-values. In general, as regards an object that needs to have a good resolution, no remarkable difference basically occurs in information between multi-values and 2-values and such a difference is not important. On the other hand, as regards an object that needs to have good tone characteristics, a large difference occurs between multi-values and 2-values, and such a difference in image quality appears as a large visual difference.

On the other hand, in the case where the halftoning process with the output histogram as in the present embodiment is executed and the ratio of intermediate tone values is very small as a whole, there is no remarkable difference between 2-value information and multi-value information. That is, even if multi-value information is simply converted to 2-value information, the possibility is low that image information is considerably lost. However, if printing is actually executed by the output apparatus such as a printer, a difference in image quality occurs depending on whether texture occurs or whether smooth tone transition is realized.

Figure 12:
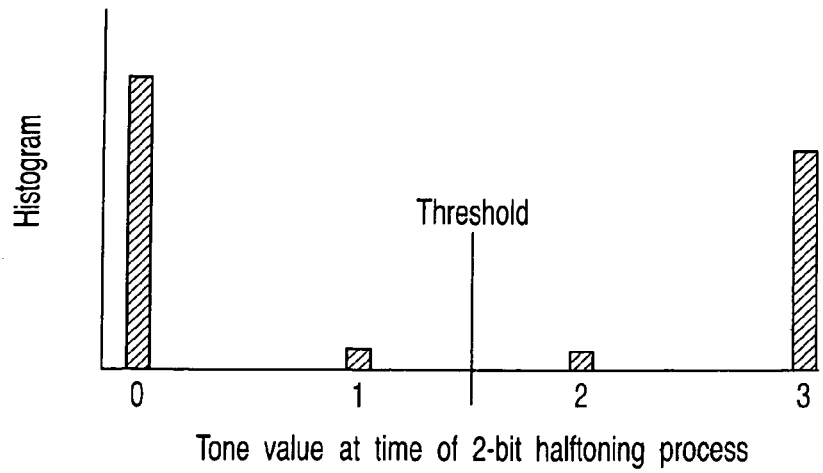
FIG. 12 is a histogram showing gray-level values at a time of 2-bit halftoning.

From the standpoint of seamless handling of an image, the present embodiment aims at constructing a system that can handle two-value information when a rasterized image is used or reused for other purposes in association with PC-FAX or electronic file data. In the above-described halftoning process, the multi-value halftoning process is realized. However, in the present embodiment, when the multi-value image data is to be converted to 2-value image data, a threshold process is executed at an intermediate value of the output of the multi-value data after the halftoning process, as shown in FIG. 12. Thereby, the multi-value image data is converted to 2-value image data. In short, conversion to 2-value image data is executed by using a highest-level bitplane of the output image after the halftoning process.

As regards the photo or graphic object that needs to have good tone characteristics, the number of gray levels is decreased by the above-described simple 2-value conversion. Consequently, the number of reproducible gray levels becomes too small, and a problem of, e.g. pseudo-outline occurs. As a result, the tone reproduction characteristics deteriorate. In order to deal with this problem, in the present embodiment, the halftoning process section 25 is realized with a structure as shown in FIG. 13.

Figure 13:
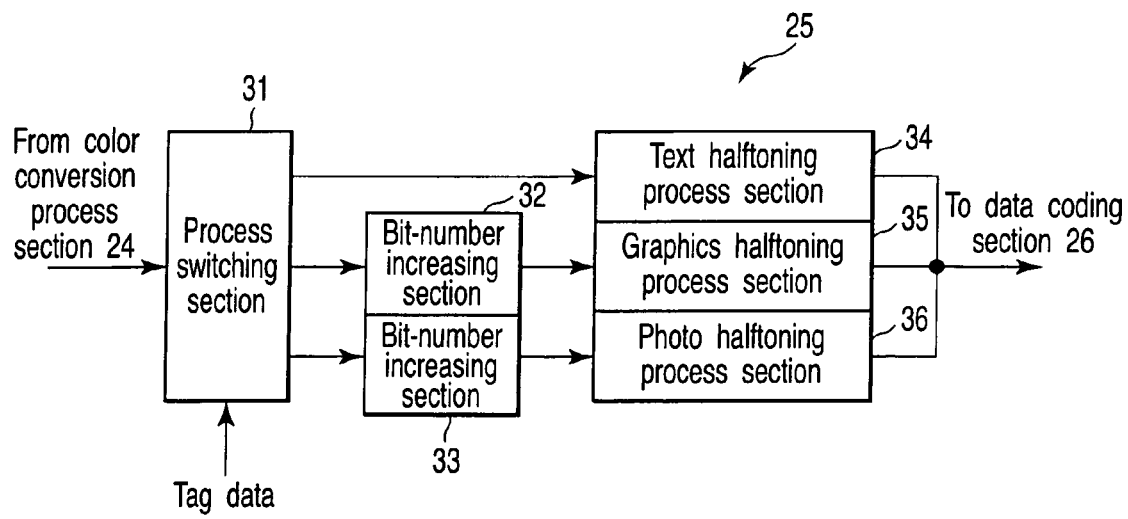
FIG. 13 shows the structure of a halftoning process section.

In FIG. 13, the halftoning process section 25 comprises a process switching section 31 that switches the process of a signal from the color conversion process section 24; a bit-number increasing section 32 that increases the bit number for graphics; a bit-number increasing section 33 that increases the bit number for a photo; a text halftoning process section 34; a graphics halftoning process section 35; and a photo halftoning process section 36.

With this structure, in order to prevent reduction in tone characteristics due to 2-value conversion, an operation for increasing the number of gray levels is performed in a pseudo fashion prior to the halftoning process when a photo or graphic object is to be processed.

For example, in the front stage of the graphics halftoning process section 35, the bit-number increasing section 32 increases the number of gray levels from normal 8 bits of an input image to 9 bits by proper interpolation. In addition, in the front stage of the photo halftoning process section 36, the bit-number increasing section 33 increases the number of gray levels from normal 8 bits of an input image to 10 bits by proper interpolation.

Accordingly, each of the multi-value halftoning process sections 34, 35 and 36 for the respective objects executes the halftoning process corresponding to the input number of gray levels and increases the pseudo-number of gray levels that are to be output. In this example, 1024 gray levels are secured for a photo in a pseudo fashion, and 512 gray levels are secured for a graphic in a pseudo fashion. Thus, a decrease in number of gray levels due to conversion to 2-value data can be prevented.

The interpolation method in this case may be an interpolation method in which neighboring pixels of a pixel of interest are referred to, or a gray-level number increasing method by an ordinary gamma conversion.

This example relates to the method of increasing the number of gray levels prior to the halftoning process. Alternatively, an arbitrary gray-level bit number (e.g. 9 bits or 10 bits) may directly be handled in the color conversion process section 24, or an arbitrary gray-level bit number (e.g. 9 bits or 10 bits) may directly be handled in the RIP section.

In the present embodiment, the method of varying the bit number on an object-by-object basis has been described. However, it is not necessary to increase the bit numbers of different objects to different bit numbers, or it is possible to increase the bit numbers of all objects to the same bit number.

In the present embodiment, as regards the position of the process in the case of converting multi-value image data after the halftoning process to 2-value image data, the data stored in the memory device 27 is read out and the multi-value image data is converted to 2-value data in the data decoding section 28.

Figure 14:
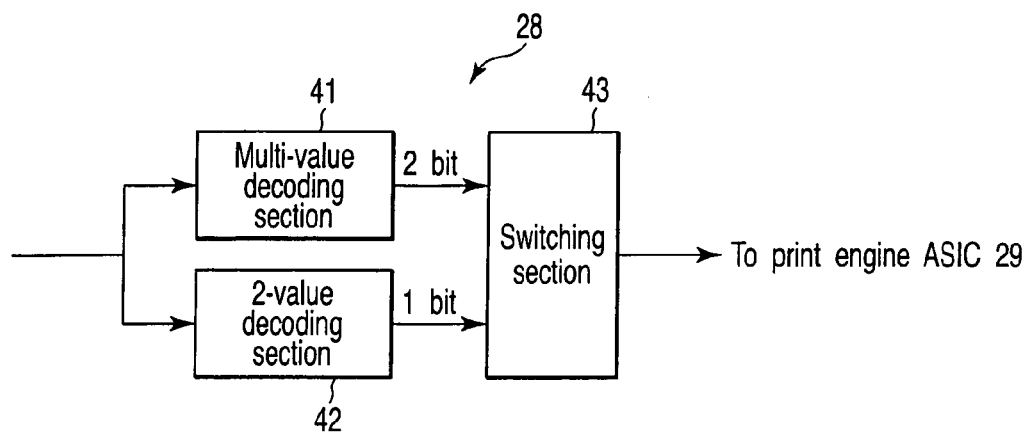
FIG. 14 shows an example of the structure for realizing output switching from multi-values to 2-values in a data decoding section.
Figure 15:
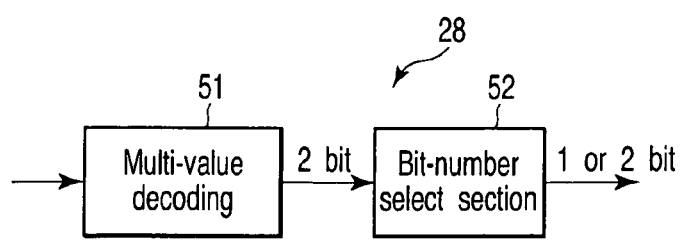
FIG. 15 shows an example of the structure for realizing output switching from multi-values to 2-values in the data decoding section.

FIGS. 14 and 15 show examples of structures that realize output switching from multi-values to 2-values in the data decoding section 28.

In FIG. 14, the data decoding section comprises a multi-value decoding section 41, a 2-value decoding section 42 and a switching section 43. The switching in the switching section 43 is effected by an operation panel (not shown) or personal computer 11. As mentioned above, the compression algorithm compresses one reference bitplane by a coding scheme such as JBIG, and encodes another bitplane by using information on a difference from the reference bitplane. By setting the reference bitplane to be the highest-level bitplane of the output image, only the reference bitplane may be decoded without using the difference information of this another bitplane. Thereby, 2-value image data can easily be obtained.

In FIG. 15, the data decoding section comprises a multi-value decoding section 51 a bit-number select section 52. Bit-number selection in the bit-number selection section 52 is instructed by an operation panel (not shown) or personal computer 11. In this structure, an output may not directly be delivered to the printer engine ASIC 29. In a case where it is understood in advance that image data is to be used for another function of, e.g. PC-FAX, multi-value image data, which is subjected to the halftoning process, may be converted to 2-value data at the time of encoding the image data. This conversion method is easily implemented by using the highest-level bitplane.

In this embodiment, the single multi-value halftoning module can easily execute conversion between multi-values and 2-values, depending on systems to be handled. With a simple hardware architecture, a seamless system is realized. In addition, the architecture is easily applicable to both color and monochromatic systems.

The above description relates to the case in which the multi-value halftoning process is the 2-bit process. Alternatively, this invention is applicable to a multi-value halftoning process of an arbitrary number of bits. Basically, if the number of bits in the halftoning process increases, the number of reproducible gray levels tends to decrease when conversion to 2-bit image data is executed. This problem can properly be solved by the pseudo gray-level-number increasing operation.

The present embodiment relates to the halftoning process using the one-to-one-correspondence organization dither method. Needless to say, a person skilled in image processing can easily apply the halftoning process to a density pattern method with N (N>2) outputs for 1 input pixel of continuous tone.

Besides, in the present embodiment, three kinds of objects, i.e. text, graphic and photo, are handled. However, even if the number of kinds of objects is increased or decreased to two, the process for this can be realized no special structural change, as is easily conceivable.

As has been described above, according to the above-described embodiment of the invention, it is possible to execute the multi-value halftoning process with the simple system configuration, obtain image data with a high compression ratio, and enhance the performance of the entire system.

Further, since the image data that is subjected to the multi-value halftoning process can easily be converted to 2-value image data, the functions of the MFP can easily and seamlessly be connected.

Moreover, since the optimal halftoning process is executed for each of the kinds of objects, the information of the associated object can extracted to a maximum and an image defect can be prevented even when conversion to 2-value image data is executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that executes an image process for input image data, a number of gray levels of the input image data being a first number, comprising:
    an attribute analysis section that analyzes an attribute of the image data;
    a bit number increasing section that outputs bit-increased image data which has a second number of gray levels, the second number being greater than the first number;
    halftoning process sections associated with a plurality of attributes, which execute multi-value halftoning processes in accordance with attributes that are analyzed by the attribute analysis section, at least one of the halftoning process sections applying one of the multi-value halftoning processes to the bit-increased image data, the other one of the halftoning process sections applying the other one of the multi-value halftoning processes to the input image data;
    a switching section that outputs at least one of the outputs from the halftoning process sections according to the attribute analyzed by the attribute analysis section;
    a coding section that encodes an output from the switching section;
    a memory section that stores the image data that is encoded by the coding section; and
    a decoding section that decodes the image data that is stored in the memory section.

2. The image processing apparatus according to claim 1, wherein each bit of the output from the switching section corresponds to each of a plurality of bitplanes, the coding section enclodes a reference bitplane of the plurality of bitplanes by a standard 2-value reversible coding process, and encodes, with respect to the other bitplane that is an object, a difference between the reference bitplane and the other of the plurality of bitplanes.

3. The image processing apparatus according to claim 1, wherein the coding section executes encoding by switching a unit reproducible gray-level number of the image data that is subjected to the multi-value halftoning process, in accordance with a plurality of functions of the image processing apparatus.

4. The image processing apparatus according to claim 3, wherein the switching of the unit reproducible gray-level number in the coding section is executed between 2-values and multi-values.

5. The image processing apparatus according to claim 1, wherein the decoding section executes decoding by switching a unit reproducible gray-level number of the image data that is subjected to the multi-value halftoning process, in accordance with a plurality of functions of the image processing apparatus.

6. The image processing apparatus according to claim 5, wherein the switching of the unit reproducible gray-level number in the decoding section is executed between 2-values and multi-values.

7. An image processing apparatus that executes an image process for input image data, a number of gray levels of the input image data being a first number, comprising:
    an attribute analysis section that analyzes an attribute of the image data;
    a bit number increasing section that outputs bit-increased image data which has a second number of gray levels, the second number being greater than the first number;
    halftoning process sections associated with a plurality of attributes, which execute multi-value halftoning processes in accordance with attributes that are analyzed by the attribute analysis section, at least one of the halftoning process sections applying one of the multi-value halftoning processes to the bit-increased image data, the other one of the halftoning processes to the bit-increased image data, the other one of the halftoning process sections applying the other one of the multi-value halftoning processes to the input image data;
    a switching section that outputs at least one of the outputs from the halftoning process sections according to the attribute analyzed by the attribute analysis section;
    a coding section that encodes an output from the switching section;
    a memory section that stores the multi-value image data that is encoded by the coding section; and
    a decoding section that executes decoding by converting the multi-value image data that is stored in the memory section to 2-value image data.

8. The image processing apparatus according to claim 7, wherein the halftoning process section subjects the input gray-level number that is increased by the increasing section to a multi-value halftoning process that provides a pseudo equivalent gray-level number, thereby increasing a number of multi-value gray levels that are output by the multi-value halftoning process.

9. The image processing apparatus according to claim 7, wherein each bit of the output from the switching section corresponds to each of a plurality of bitplanes, when the decoding section converts the multi-value image data to 2-value image data, the decoding section develops the image data that is subjected to the multi-value halftoning process to the plurality of bitplanes, and applies a highest-level bitplane of the bitplanes to the 2-value image data.

10. An image processing apparatus that executes an image process for input image data, a number of gray levels of the input image data being a first number, comprising:
    an attribute analysis section that analyzes an attribute of the image data;

a bit number increasing section that outputs bit-increased image data which has a second number of gray levels, the second number being greater than the first number;

halftoning process sections associated with a plurality of attributes, which execute multi-value halftoning processes in accordance with attributes that are analyzed by the attribute analysis section, at least one of the halftoning process sections applying one of the multi-value halftoning processes to the bit-increased image data, the other one of the halftoning process sections applying the other one of the multi-value halftoning processes to the input image data;

a first switching section that outputs at least one of outputs from the halftoning process sections according to the attribute analyzed by the attribute analysis section;

a coding section that encodes an output from the first switching section;

a memory section that stores the image data that is encoded by the coding section;

a first decoding section that decodes the image data that is stored in the memory section to multi-value image data;

a second decoding section that decodes the image data that is stored in the memory section to 2-value image data; and a second switching section that executes switching between the multi-value image data that is decoded by the first decoding section and the 2-value image data that is decoded by the second decoding section.

* * * * *